United States Patent

Song

(10) Patent No.: US 11,313,288 B2
(45) Date of Patent: Apr. 26, 2022

(54) METHOD OF TWO-STEP VVL LIFT MALFUNCTION AVOIDANCE LEARNING CONTROL AND ELECTRIC TWO-STEP VVL SYSTEM THEREOF

(71) Applicants: HYUNDAI MOTOR COMPANY, Seoul (KR); KIA MOTORS CORPORATION, Seoul (KR)

(72) Inventor: Jae-Hyeok Song, Incheon (KR)

(73) Assignees: HYUNDAI MOTOR COMPANY, Seoul (KR); KIA MOTORS CORPORATION, Seoul (KR)

( * ) Notice: Subject to any disclaimer, the term of this patent is extended or adjusted under 35 U.S.C. 154(b) by 224 days.

(21) Appl. No.: 16/698,172

(22) Filed: Nov. 27, 2019

(65) Prior Publication Data

US 2021/0010431 A1 Jan. 14, 2021

(30) Foreign Application Priority Data

Jul. 8, 2019 (KR) .......................... 10-2019-0081913

(51) Int. Cl.
*F01L 1/34* (2006.01)
*F02D 13/02* (2006.01)
*F02D 41/00* (2006.01)
*F01L 13/00* (2006.01)
*B60W 10/06* (2006.01)
(Continued)

(52) U.S. Cl.
CPC ......... *F02D 13/0273* (2013.01); *B60W 10/06* (2013.01); *B60W 10/08* (2013.01); *B60W 20/15* (2016.01); *F01L 13/0015* (2013.01); *F02D 13/0207* (2013.01); *F02D 41/009* (2013.01); *F01L 13/0036* (2013.01); *F01L 2800/00* (2013.01); *F02D 2200/04* (2013.01); *F02D 2200/08* (2013.01); *F02D 2200/101* (2013.01)

(58) Field of Classification Search
CPC ............. F02D 13/0273; F02D 13/0207; F02D 41/009; F02D 2200/04; F02D 2200/08; F02D 2200/101; B60W 20/15; B60W 10/06; B60W 10/08; F01L 13/0015
See application file for complete search history.

(56) References Cited

U.S. PATENT DOCUMENTS 7,047,924 B1 * 5/2006 Waters ................... F02D 41/221
123/90.16
7,063,057 B1 * 6/2006 Waters ................ F01L 13/0036
123/90.16
(Continued)

FOREIGN PATENT DOCUMENTS

KR 10-2018-0022126 A 3/2018

*Primary Examiner* — Gonzalo Laguarda
(74) *Attorney, Agent, or Firm* — Lempia Summerfield Katz LLC

(57) ABSTRACT

A method of two-step variable valve lift (VVL) malfunction avoidance learning control may include: in a two-step VVL system which is operated with a main lift and a secondary lift, verifying, by an electronic control unit (ECU), an operation avoidance area based on locking of a lock pin of a cam follower ; performing VVL operation learning, in which a failure of occurrence of the second lift is determined on the basis of a locking failure of the cam follower due to an initially set value of the operation avoidance area; and reflecting the operation avoidance area to the two-step VVL system with a corrected set value which is obtained through the VVL operation learning.

15 Claims, 10 Drawing Sheets

(51) Int. Cl.
   *B60W 10/08*   (2006.01)
   *B60W 20/15*   (2016.01)

(56) References Cited

U.S. PATENT DOCUMENTS

| | | | |
|---|---|---|---|
| 8,056,516 B2* | 11/2011 | Cinpinski | F02D 13/0219 |
| | | | 123/90.15 |
| 8,621,917 B2* | 1/2014 | Fedewa | F01L 1/34 |
| | | | 73/114.79 |
| 2018/0058360 A1 | 3/2018 | Lee et al. | |
| 2021/0024054 A1* | 1/2021 | Song | F02D 13/0215 |

* cited by examiner

METHOD OF TWO-STEP VVL LIFT MALFUNCTION AVOIDANCE LEARNING CONTROL AND ELECTRIC TWO-STEP VVL SYSTEM THEREOF

CROSS-REFERENCE TO RELATED APPLICATION

This application claims priority to and the benefit of Korean Patent Application No. 10-2019-0081913, filed on Jul. 8, 2019, the entire contents of which are incorporated herein by reference.

FIELD

The present disclosure relates to a variable valve lift (VVL) control. More particularly, it relates to an electric two-step VVL system performed through two-step VVL operation learning control.

BACKGROUND

The statements in this section merely provide background information related to the present disclosure and may not constitute prior art.

In general, among variable valve lift (VVL) systems, an electric two-step VVL system for an exhaust valve has a feature in which a VVL actuator is in conjunction with an operation of a cam follower due to a two-step lift cam, thereby implementing an exhaust main lift (or a first lift) of the exhaust valve before an intake lift followed by a second lift (or a second lift) during the intake lift.

In particular, owing to electric control of the VVL actuator for the cam follower, the electric two-step VVL system is independent from environmental conditions such as an outside temperature, an oil temperature, and the like such that robust lift ON/OFF control is possible with respect to the secondary lift.

Further, VVL control is performed to control the electric two-step VVL system to operate in an operation avoidance area in which, even when a VVL operation signal is detected, the electric two-step VVL system waits for a desired time and then operates. The operation avoidance area may be set to fundamentally eliminate possibility of incomplete engagement of a lock pin causing a locking failure which damages continuity of a main lift and a secondary lift.

Thus, when the electric two-step VVL system is operating in low-temperature outdoor air, the electric two-step VVL system may extend a limit temperature of a low-temperature area, which is resulting from the lack of hydraulic responsiveness in a pressure chamber due to an increase in oil viscosity, to a temperature of −10 degrees. Consequently, the electric two-step VVL system may be utilized suitable for real-driving emissions (RDE) regulation in which evaluation of a real-driving allowable exhaust standard is defined.

However, the VVL control is a method which maintains an initially set value (e.g., a response time) of the operation avoidance area.

Therefore, in the operation avoidance area, physical changes due to abrasion and deformation of the VVL system, changes in humidity and temperature of outdoor air, and environmental changes due to a decrease in operating voltage resulting from battery aging cannot be reflected to the initial value, and this limitation is inadequate to fundamentally eliminate probability of an incomplete engagement of the lock pin.

Specifically, since the physical changes are further intensified due to an increase in the service life, an effect of preventing a locking failure of the lock pin due to the operation avoidance area is inevitably lowered.

SUMMARY

An embodiment of the present disclosure is directed to a method of two-step variable valve lift (VVL) malfunction avoidance learning control and an electric two-step VVL system, which are capable of fundamentally eliminate probability of an incomplete engagement of a lock pin through VVL operation learning during driving of a vehicle and, specifically, controlling two-step VVL operating learning to maintain an effect of an operation avoidance area by absorbing system aging due to physical and environmental changes in VVL system mechanism as changes in operation avoidance area through the VVL operation learning.

Other objects and advantages of the present disclosure can be understood by the following description and become apparent with reference to the embodiments of the present disclosure. Also, it is obvious to those skilled in the art to which the present disclosure pertains that the objects and advantages of the present disclosure can be realized by the means as claimed and combinations thereof In accordance with an embodiment of the present disclosure, there is provided a method of two-step variable valve lift (VVL) malfunction avoidance learning control for two-step VVL operating learning control. In particular, when a lift controller verifies a VVL operation, which is implemented of a main lift and a secondary lift to which an operation avoidance area due to locking of a lock pin of a cam follower is applied, the method performs VVL operation learning, in which a failure of occurrence of the second lift is determined on the basis of a locking failure due to an initially set value of the operation avoidance area, and correct the operation avoidance area with a corrected set value which is obtained through the VVL operation learning.

In an exemplary embodiment, the initially set value and the corrected set value may be response times, and each of the response times may be an elapsed time from a VVL operation signal to the occurrence of the secondary lift.

In an exemplary embodiment, the operation avoidance area may be represented by an operation avoidance area curve in which a cam angle is matched to an engine speed.

In an exemplary embodiment, the system application control may include VVL operation learning execution control of determining a vehicle condition in which the VVL operation learning is performable, and detecting the occurrence of the secondary lift by setting the response time as an elapsed time from the VVL operation signal until the secondary lift is occurred; and VVL operation learning determination control of calculating function values in a range of 0 to 1 on the basis of a response reference time with respect to the response time and the occurrence of the secondary lift, and correcting the operation avoidance area by changing the initially set value into the corrected set value due to the function value.

In an exemplary embodiment, the vehicle condition of the system application control may include any one among engine overrun, neutral control, electric vehicle (EV) driving.

In an exemplary embodiment, the VVL operation learning execution control may be performed through detecting a VVL operation cycle, in which a time interval between an end time point of the main lift and an occurrence time point of the secondary lift is set to the VVL operation cycle;

verifying a VVL response time, in which the response time in the VVL operation cycle is increased by as much as a response time interval; and detecting the occurrence of the secondary lift, in which the number of times the secondary lift is occurred for the response time.

In an exemplary embodiment, the verifying of the VVL response time in the VVL operation learning execution control may include setting the response time to a minimum response time or a maximum response time; setting the response time interval to the response time by as much as 1 ms; and increasing the response time interval from the minimum response time to the maximum response time.

In an exemplary embodiment, the VVL operation learning determination control may be performed through calculating the response time on the basis of a minimum response time in which the secondary lift is occurred and a maximum response time in which the secondary lift is not occurred; applying a function to the response time and the response reference time to calculate function values in a range of 0 to 1; determining a function value area for correcting an operation avoidance area by classifying the calculated function values; and correcting the operation avoidance area by setting the function value area to the corrected set value.

In an exemplary embodiment, the response reference time in the VVL operation learning determination control may be calculated as an average value of the minimum response time and the maximum response time.

In an exemplary embodiment, the classifying of the functional values in the VVL operation learning determination control may be performed to obtain a function value of 0.012 with respect to a failure of the secondary lift, a function value of 0.997 with respect to success of the secondary lift, and a function value in a range of 0.01 to 0.99 with respect to a change in initially set value. The function value of 0.997 may be a condition of verifying that the number of times the secondary lift is occurred is five or more times during the response time.

In an exemplary embodiment, the corrected set value in the VVL operation learning determination control may set a response time band, the response time band may be classified into a minimum operation avoidance response time and a maximum operation avoidance response time, and each of the minimum operation avoidance response time and the maximum operation avoidance response time may have a margin with respect to 1 ms resolution.

In accordance with another embodiment of the present disclosure, there is provided an electric two-step variable valve lift (VVL) system includes, when a two-step VVL system implemented of a main lift and a secondary lift operates, a lift controller configured to execute system application control, perform VVL operation learning with respect to success of the secondary lift for a response time of an operation avoidance area preventing a locking failure of a lock pin of a cam follower, and correct the operation avoidance area by correcting a response time band with respect to the response time through the VVL operation learning; and a VVL operation avoidance area map in which an operation avoidance area curve with respect to the response time band is corrected such that the operation avoidance area is corrected.

In an exemplary embodiment, the lift controller may receive a flow rate measurement value of an exhaust gas out-in flux supplied to a cylinder of an engine from a hot wire sensor, and the hot wire sensor may be provided at any one cylinder branch pipe among cylinder branch pipes of an intake manifold connected to the engine.

Further areas of applicability will become apparent from the description provided herein. It should be understood that the description and specific examples are intended for purposes of illustration only and are not intended to limit the scope of the present disclosure.

DRAWINGS

In order that the disclosure may be well understood, there will now be described various forms thereof, given by way of example, reference being made to the accompanying drawings, in which.

Figure 1:
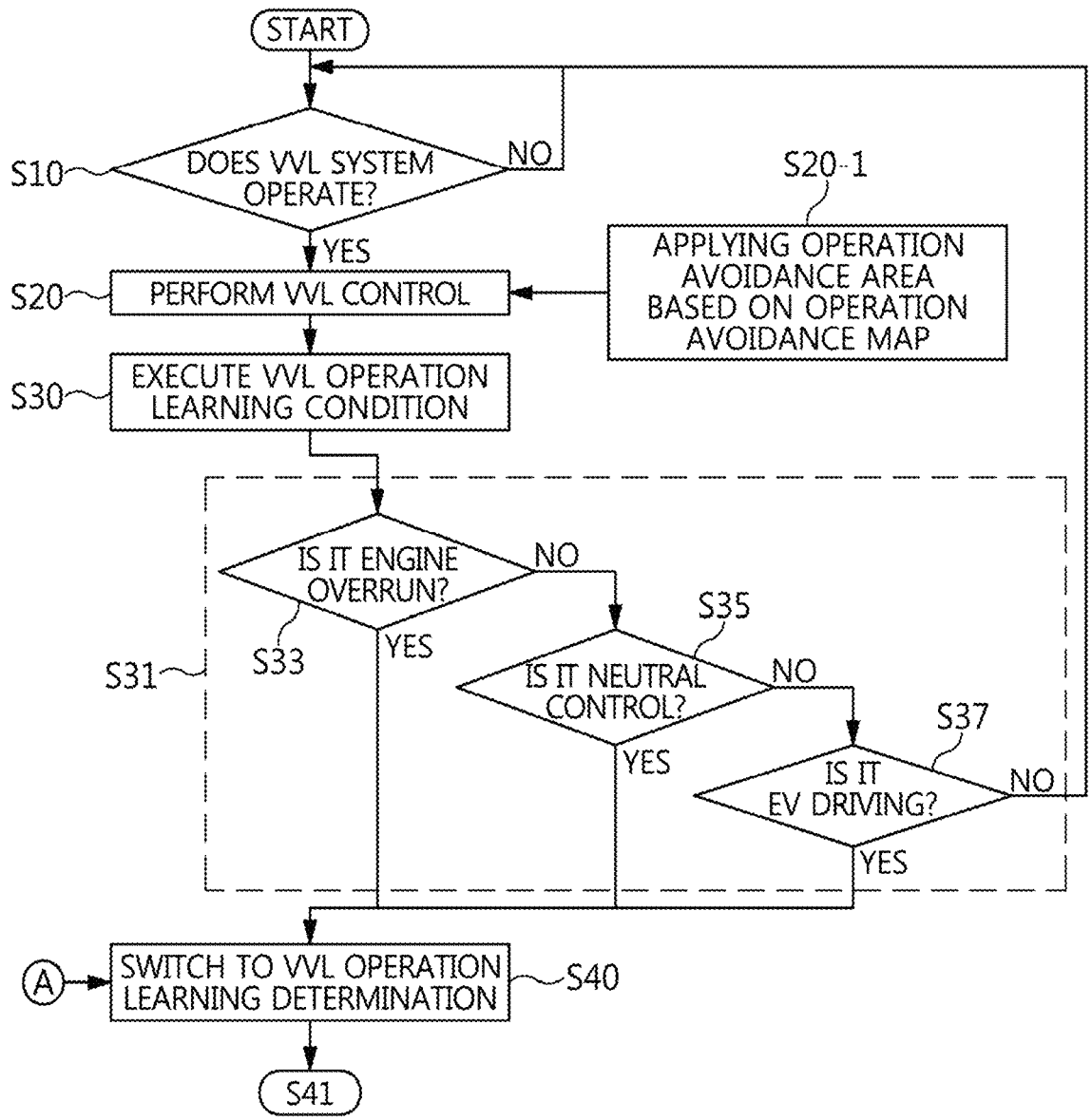
FIGS. 1 to 4 are flowcharts illustrating a method of two-step variable valve lift (VVL) operation learning control according to one form of the present disclosure which is characterized by system application control and is implemented by a method of two-step VVL malfunction avoidance learning control.

The drawings described herein are for illustration purposes only and are not intended to limit the scope of the present disclosure in any way.

DETAILED DESCRIPTION

The following description is merely exemplary in nature and is not intended to limit the present disclosure, application, or uses. It should be understood that throughout the drawings, corresponding reference numerals indicate like or corresponding parts and features.

Exemplary embodiments of the present disclosure will be described below in more detail with reference to the accompanying drawings, and these embodiments are examples of the present disclosure and may be implemented in various other different forms by those skilled in the art to which the present disclosure pertains so that the present disclosure is not limited to these embodiments.

Referring to FIGS. 1 to 4, a method of two-step variable valve lift (VVL) malfunction avoidance learning control for two-step VVL learning control performs system application control in operations S30 to S50 during VVL operation control in operations S10 and S20 such that an initially set value of a response reference time is used by being changed to a corrected set value due to updating of an operation avoidance area map in operation S60 or the initially set value thereof is used with no change due to maintaining of the operation avoidance area map in operation S70.

For example, the system application control (S30 to S50) is divided into a VVL operation learning condition control in operation S30, a VVL operation learning execution control in operation S40, and a VVL operation learning determination control in operation S50.

In particular, the VVL operation learning condition control (S30) is not limited to types of vehicles including an internal combustion engine vehicle capable of learning a VVL operation in engine overrun, an advanced driver assistance system (ADAS) mounted vehicle capable of learning an VVL operation in neutral control, and a hybrid vehicle capable of learning a VVL operation during electric vehicle (EV) driving.

Further, the VVL operation learning execution control (S40) detects occurrence of a secondary lift according to an increase in a response time interval obtained by dividing a VVL response time so that a lift cycle of an exhaust valve (i.e., ON/OFF time periods of a main lift and a secondary lift of the exhaust valve) is used.

Further, the VVL operation learning determination control (S50) facilitates determination of the response reference time with respect to the occurrence of the secondary lift by applying a sigmoid function and improves reliability by reflecting a performance difference between measurement instruments with respect to a valve lift through a minimum/maximum response time band.

Thus, when the operation avoidance area needs to be changed according to an increase in service life and a change in environmental condition, the method of two-step VVL operation learning control may verify sustainability and validity of the operation avoidance area through self VVL operation learning during vehicle driving. Further, when a change of the operation avoidance area is determined as being desired, the method of two-step VVL operation learning control changes the operation avoidance area to prevent physical damage due to a locking failure. In particular, the method of two-step VVL operation learning control has a feature in which the change of the operation avoidance area due to the self VVL operation learning solves a state in which the response reference time is delayed with respect to initial mapping due to physical changes (e.g., abrasion, deformation, and the like) of a VVL system mechanism or environmental changes (e.g., a temperature of outdoor air, humidity, a decrease in operating voltage due to battery aging).

Figure 5:
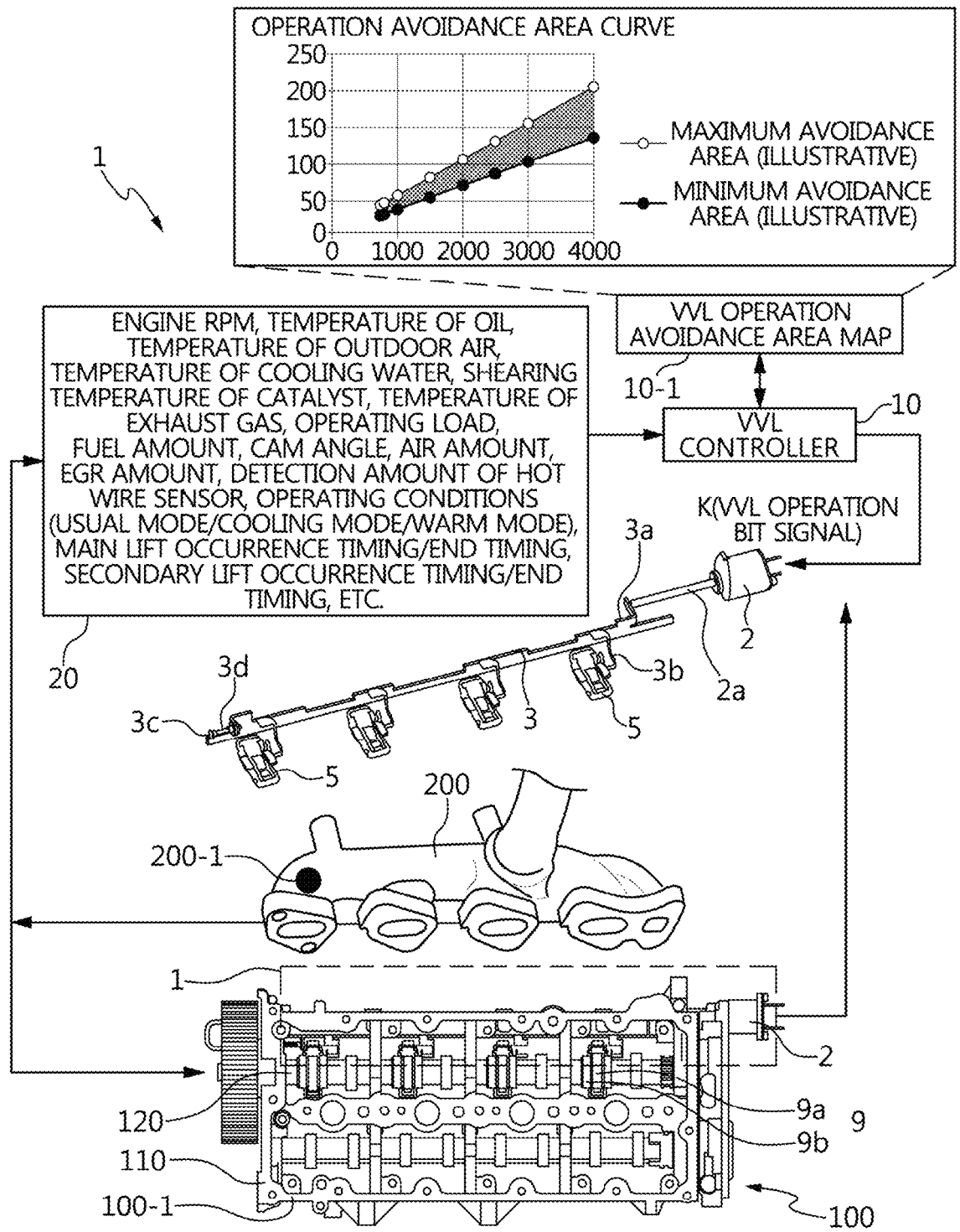
FIG. 5 is a diagram illustrating an example of a vehicle to which an electric two-step VVL system implementing the method of two-step VVL operating learning control according to one form of the present disclosure is applied.

Meanwhile, FIG. 5 illustrates an example of an electric two-step VVL system 1 which is applied to a vehicle 100 to implement the two-step VVL operation learning control with the system reflection control (S30 to S50).

As shown in the drawing, the vehicle 100 includes an engine 100-1, an intake manifold 200, a camshaft 120, and an exhaust valve 130, which are in conjunction with the electric two-step VVL system 1. In this case, the vehicle 100 includes an internal combustion engine vehicle having an engine as a power source, an ADAS mounted vehicle having a map database and a system for assisting safe driving during drowsiness and fog, and a hybrid vehicle having an engine and an electric motor as power sources.

Specifically, the electric two-step VVL system 1 includes a VVL actuator 2, a slider 3, a cam follower 5, a hydraulic lash adjuster (HLA) 7, a two-step lift cam 9, and a lift controller 10 and controls the exhaust valve 130 in conjunction with the camshaft 120, which is provided at a cylinder head 110 of the engine 100-1, with a main lift and a secondary lift. With the above configuration, the electric two-step VVL system 1 uses a conventional electric two-step VVL component, performs a system operation through VVL control to which an operation avoidance area is applied, and performs the system application control (S30 to S50) in a specific vehicle driving condition to correct and change a response reference time with respect to occurrence of the secondary lift.

For example, the VVL actuator 2 and the slider 3 implement a movement of a lock pin 5c of the cam follower 5 to be locked or unlocked. To this end, the VVL actuator 2 is mounted outside the cylinder head 110 to push the slider 3 under the control of the lift controller 10. Owing to the pushing of the actuator 2, the slider 3 switches the lock pin 5c of the cam follower 5 from unlocking to locking.

Further, the VVL actuator 2 has an actuator pin 2a which is drawn to push the slider 3 when an operation of the VVL actuator 2 is turned on, whereas, which is inserted to return to an initial state when the operation of the VVL actuator 2 is turned off. In this case, the actuator pin 2a is located inside the cylinder head 110 to push the slider 3. Further, the slider 3 is formed of a plate body matched with the length of the camshaft 120 and is disposed parallel to a side surface of the camshaft 120. A pin arm 3a, a spring arm 3b, a slider support rod 3c, and a return spring 3d are provided on the plate body.

For example, the pin arm 3a is formed in a "⌐" shape and is welded to or integrated with the plate body at one end of the slider 3 so that the pin arm 3a is brought into contact with the actuator pin 2a of the actuator 2 to push the slider 3. The spring arm 3b is formed in a "⌐" shape and is welded to or integrated with the plate body on a side surface of the slider 3 in a length direction of the slider 3 so that, when the slider 3 is pushed, the spring arm 3b pressurizes the lock pin 5c of the cam follower 5. In this case, the spring arm 3b is located on a side surface of the cam follower 5 according to a quantity thereof. The slider support rod 3c is fixed to an interior of the cylinder head 110 to be coupled to one side of the slider 3 (i.e., a side opposite the pin arm 3a), thereby supporting sliding movement of the slider 3. The return spring 3d is coupled to the slider support rod 3c to transfer an elastic compressive force due to the sliding movement of the slider 3 to the slider 3 when the slider 3 returns to its initial position.

For example, the cam follower 5, the HLA 7, and the two-step lift cam 9 are connected to each other to implement a main lift and a secondary lift of the exhaust valve 130. To this end, in order to implement the main lift and the secondary lift, the cam follower 5 is brought into contact with the two-step lift cam 9 and the exhaust valve 130. The HLA 7 always maintains a contact between a valve system and a plunger by allowing oil, which is supplied through an oil supply line, to vertically move the plunger while flowing to a low pressure chamber and the high pressure chamber of an oil chamber and to compensate a gap between a valve and a cam. The HLA 7 controls an operation of the cam follower 5, which transfers rotational movement of the camshaft 120, using a hydraulic pressure to adjust a valve lifting amount. The two-step lift cam 9 is provided at the camshaft 120 to implement an operation of the cam follower 5 for the main lift and the secondary lift.

Therefore, the cam follower 5, the HLA 7, and the two-step lift cam 9 are components of a conventional two-step VVL system, and the number of the cam followers 5, the HLAs 7, and the two-step lift cams 9 is equal to the number of cylinders of the engine 100-1 (e.g., when the number of cylinders is four, four cam followers 5, four HLAs 7, and four two-step lift cams 9 are provided).

Specifically, the lift controller 10 is an electronic control unit (ECU) which includes a memory, in which a logic for performing the system application control (S30 to S50) is programmed and stored, and outputs a VVL operation BIT signal K. Further, the lift controller 10 includes lifting amount adjustment control of intake and exhaust valves as a basic logic in the memory, wherein the lifting amount adjustment control decreases a lifting amount at low speed whereas increases the lifting amount at high speed to increase filling efficiency, thereby uprating an engine output and achieving improvement of fuel efficiency. To this end, the lift controller 10 operates as a central processing unit in conjunction with the memory and includes a VVL operation avoidance area map 10-1 and a data processor 20 to read or calculate desired information or data.

For example, the VVL operation avoidance area map 10-1 corrects and changes an initial value on the basis of an operation avoidance area and result values of a minimum/ maximum response time band, which are calculated through the system application control (S30 to S50). To this end, the VVL operation avoidance area map 10-1 includes an operation avoidance area curve in which a cam angle is matched to an engine speed. The operation avoidance area curve is classified into a minimum operation avoidance response time curve and a maximum operation avoidance response time curve.

For example, the data processor 20 detects operation information on the engine 100-1 and operation information on the electric two-step VVL system 1 and transmits the detected pieces of information to the lift controller 10 as input data. The input data includes an ignition (IG) ON, an engine speed (or revolutions per minute (RPM)) of an engine), a temperature of oil, a temperature of outdoor air, a temperature of cooling water, a shearing temperature of a catalyst, a temperature of an exhaust gas, an operating load, a fuel amount, cam/crank angles, operating conditions (usual mode/cooling mode/warm mode), an air amount, a gas amount of exhaust gas recirculation (EGR), main lift occurrence timing/end timing, secondary lift occurrence timing/ end timing, a detection amount of a hot wire sensor, and the like. Therefore, the data processor 20 may be an engine ECU.

Specifically, the engine 100-1 is a gasoline engine or a diesel engine. The engine 100-1 includes the cylinder head 110 disposed on a cylinder block which forms a cylinder and configured to provide a space in which components of the electric two-step VVL system 1 are installed together with a valve train. The camshaft 120 is provided at the cylinder head 110, is interlocked with a crankshaft of the engine 100-1 to control a combustion timing through intake and exhaust valve control, and includes the two-step lift cam 9. The exhaust valve 130 is provided at the cylinder head 110, comes into contact with the cam follower 5, and implements a main lift and a secondary lift under the control of the electric two-step VVL system 1.

Further, the intake manifold 200 supplies intake air to a cylinder of the engine 100-1 and includes a hot wire sensor 200-1 at a first cylinder branch pipe of multiple branch pipes. The hot wire sensor 200-1 measures a flow rate with respect to an exhaust gas out-in flux of the intake air supplied to a first cylinder and provides the measured flow rate to the data processor 20 as a detected amount of the hot-wire sensor 200-1.

Thus, the engine 100-1, the cylinder head 110, the camshaft 120, the exhaust valve 130, the intake manifold 200, and the hot wire sensor 200-1 are components of a typical engine system.

Hereinafter, the method of two-step VVL malfunction avoidance learning control of FIGS. 1 to 4 will be described in detail with reference to FIGS. 5 to 10. In this case, a control main body is the lift controller 10 operating as the ECU, and a control target is the electric two-step VVL system 1 including the VVL actuator 2.

First, when an operation of a VVL system is verified (S10), the lift controller 10 performs the VVL operation control (S20). In this case, the VVL operation control (S20) controls the secondary lift subsequent to the main lift using an initially set value of the operation avoidance area which is applied to the operation avoidance area map 10-1.

Referring to FIG. 5, the lift controller 10 may determine the verification of the operation of the VVL system (S10) from the engine speed (RPM), the operation conditions (usual mode/cooling mode/warm mode), and the driving load among pieces of input data provided from the data processor 20. In addition, the lift controller 10 detects and verifies operating states of the VVL actuator 2, the slider 3, the cam follower 5, the HLA 7, and the two-step lift cam 9 to perform the VVL operation control (S20).

Thus, the VVL operation control (S20) avoids locking of the lock pin 5c of the cam follower 5 by as much as a minimum response time using the minimum operation avoidance response time curve of the VVL operation avoidance area map 10-1 and avoids the locking of the lock pin 5c of the cam follower 5 by as much as a maximum response time using the maximum operation avoidance response time curve thereof.

Figure 6A:
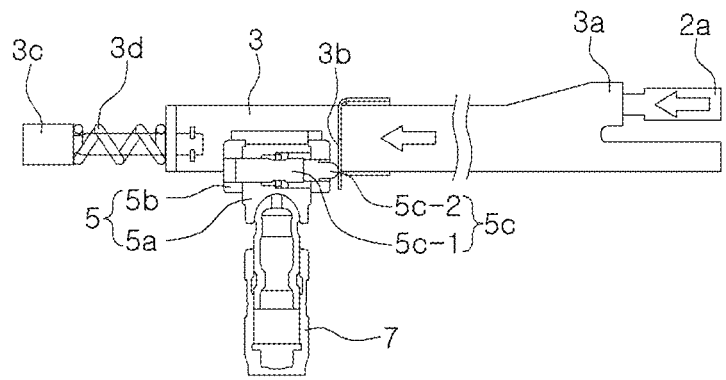
FIG. 6A is a diagram illustrating a state of the two-step VVL operation control of the electric two-step VVL system according to one form of the present disclosure.
Figure 6B:
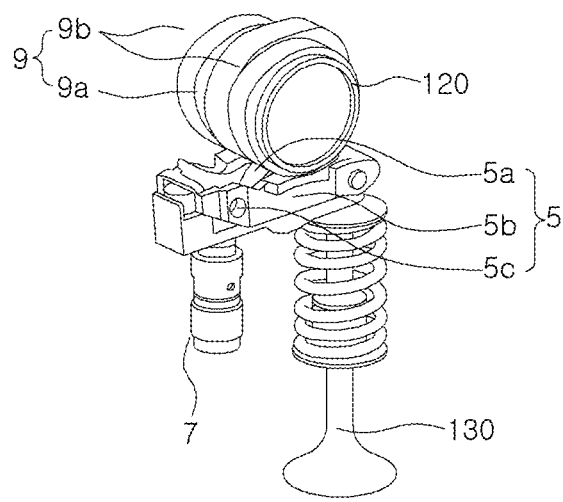
FIG. 6B is a perspective view illustrating a cam follower operating with an electric two-step lift cam in one form of the present disclosure.
Figure 6C:
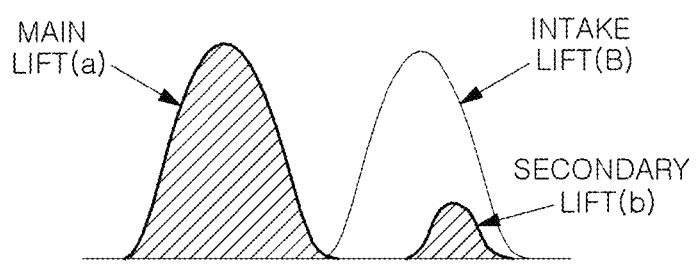
FIG. 6C is a diagram illustrating lift profiles during operation of an electric two-step VVL system in one form of the present disclosure.

Referring to the operation of the electric two-step VVL system 1 as illustrated in FIGS. 6A-6C, the actuator 2 operates the slider 3 and the cam follower 5 to implement a secondary lift (b) subsequent to a main lift (a) of the exhaust valve 130 during an intake lift (B) of an intake valve due to the two-step lift cam 9. Then, the slider 3 is pushed by a pushing force of the actuator pin 2a of the actuator 2 to lock the lock pin 5c of the cam follower 5. On the contrary, when the pushing force of the actuator pin 2a of the actuator 2 is released, the slider 3 is pushed in an opposite direction due to an elastic restoration force of the return spring 3d to return the actuator pin 2a to its initial position.

Then, in the cam follower 5, a moving lock pin 5c-1 of the lock pin 5c is pushed by being brought into contact with the spring arm 3b of the slider 3, and a fixing lock pin 5c-2 of the lock pin 5c is pushed toward the moving lock pin 5c-1 to fix an inner arm 5a and an outer lever 5b together. Further, in the two-step lift cam 9, according to a rotation of the camshaft 120 for a valve timing, a main lift cam 9a presses the inner arm 5a and a secondary lift cam 9b presses the outer lever 5b.

Accordingly, the inner arm 5a of the cam follower 5 is brought into contact with the main lift cam 9a of the two-step lift cam 9 to implement the main lift of the exhaust valve 130, and the outer lever 5b is brought into contact with the secondary lift cam 9b of the two-step lift cam 9 while surrounding the inner arm 5a to implement the secondary lift of the exhaust valve 130.

Subsequently, the lift controller 10 performs the system application control (S30 to S50) as the VVL operation learning condition control (S30), the VVL operation learning execution control (S40), and the VVL operation learning determination control (S50), and then the lift controller 10 executes the updating of the operation avoidance area on the basis of the results of the controls (S30 to S50) to correct the operation avoidance area of the VVL operation avoidance area map 10-1 or switch to maintaining of the operation avoidance area map (S70) to keep the operation avoidance area intactly.

Referring to FIG. 5, in order for the VVL operation learning condition control (S30), the VVL operation learning execution control (S40), and the VVL operation learning determination control (S50), the lift controller 10 uses a temperature of oil, a temperature of outdoor air, a temperature of cooling water, a shearing temperature of a catalyst, a temperature of an exhaust gas, an operating load, a fuel amount, cam/crank angles, operating conditions (usual mode/cooling mode/warm mode), an air amount, a gas amount of EGR, main lift occurrence timing/end timing, secondary lift occurrence timing/end timing, a detection amount of a hot wire sensor, and the like, which are the input data of the data processor 20.

Specifically, the VVL operating learning condition control (S30) is performed by matching a VVL operating learning condition (S31). The matching of the VVL operating learning condition (S31) is divided into determining an engine overrun condition (S33), determining a neutral control condition (S35), and determining an EV driving condition (S37).

For example, the engine overrun means a state in which, when an internal combustion engine vehicle is driving over a predetermined vehicle speed, a driver does not press an accelerator pedal because no further output is required, and the engine overrun is set as a condition for performing, by the internal combustion engine vehicle, VVL operating learning. The neutral control means a state in which, when an ADAS mounted vehicle stops in a driving (D) mode, a hydraulic pressure of a transmission is changed to a neutral (N) mode with no change of a gear shift lever to the N mode such that, when the ADAS mounted vehicle starts, the hydraulic pressure of the transmission is switched to the D mode, and the neutral control is set as a condition for performing, by the ADAS mounted vehicle, the VVL operating learning. The EV driving means a state in which only a motor is used as a power source as compared with a hybrid EV (HEV) mode using an engine and the motor as the power source in a hybrid vehicle, and the EV driving is set as a condition for performing, by the hybrid vehicle, the VVL operating learning.

Specifically, the VVL operation learning execution control (S40) is performed through detecting a VVL operation cycle (S41), verifying a VVL response time (S43), detecting occurrence of the secondary lift (S48), and terminating the VVL operation learning execution control (S49).

For example, the detecting of the VVL operating cycle (S41) is performed at ON/OFF times of the main lift and the secondary lift of the exhaust valve 130.

Figure 7A:
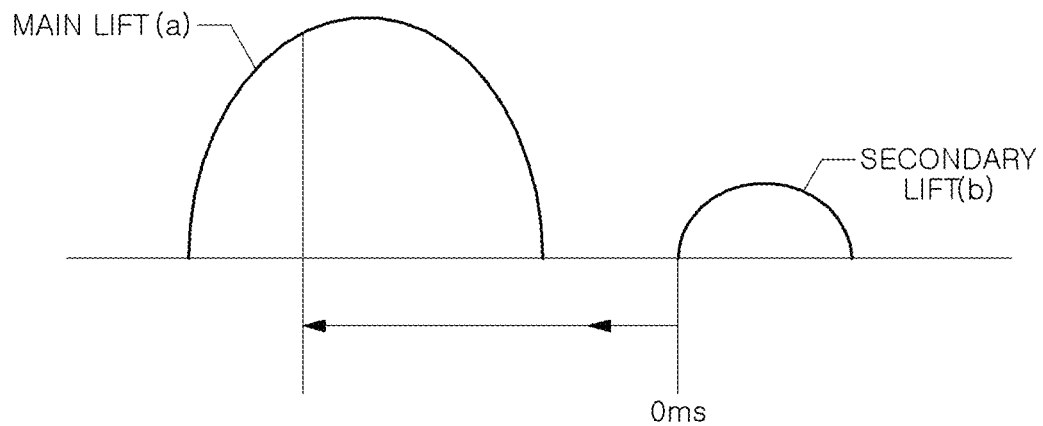
FIGS. 7A and 7B are diagrams respectively illustrating an example of determination on a lift cycle of the electric two-step VVL system for the system application control according to one form of the present disclosure.
Figure 7B:
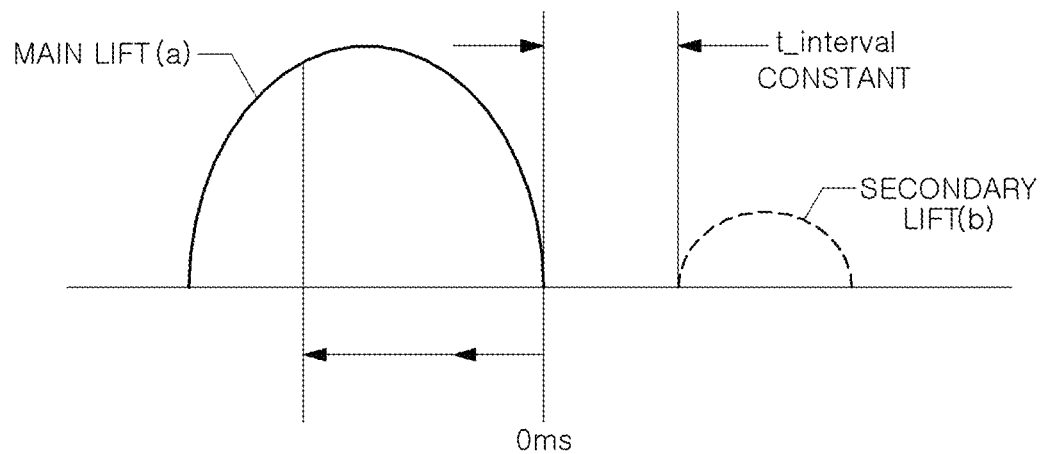

Referring to FIGS. 7A and 7B, the secondary lift b with respect to the main lift a is occurred at a time interval after the main lift a is terminated. According to the above description, a reverse counting method defines a time point at which the secondary lift b is occurred as 0 ms and then measures ON/OFF of the secondary lift b as a secondary lift variation time while increasing a time forward from 0 ms with respect to the main lift a.

Thus, a case in which the measurement of the secondary lift variation time successes in 100% is defined as a temporary lift response time, and the temporary lift response time is indicated as tresponse.

Therefore, the VVL operation cycle is defined as a predetermined time interval between an end time point of the main lift a and an occurrence time point of the secondary lift b, the defined VVL operation cycle is set within a corresponding cycle, and a time interval from a time point at which the secondary lift b is switched from On to OFF to an end time point of the main lift a is measured in the corresponding cycle. Subsequently, the end time point of the main lift a in the corresponding cycle is replaced with 0 ms, and t interval which is a time interval between the main lift a and the secondary lift b is applied to an interval between the end time point of the main lift a and the occurrence time point of the secondary lift b.

For example, the verifying of the VVL response time (S43) is performed on a response time tr which is defined as an elapsed time until a VVL operation signal is given and then the secondary lift b is occurred, and setting a VVL response time (S44), setting a response time interval (S45), and increasing the response time interval (S46) are sequentially performed. In this case, the VVL response time means a response time for the secondary lift b.

Thus, the setting of the VVL response time (S44) sets the response time tr with a minimum response time and a maximum response time within a cycle. When the minimum response time is set to 5 ms and the maximum response time is set to 25 ms, the response time tr may be set in a range of about 5 to 25 ms. The setting of the response time interval S45 sets a response time interval A which is obtained by dividing the response time tr into a minimum unit. The response time interval A may be set to about 1 ms. The increasing of the response time interval (S46) is an operation of increasing a response time interval by 1 ms which is the response time interval A. The response time interval is accumulated as "K=K+A."

For example, as shown in FIG. 5, the detecting of the occurrence of the secondary lift (S48) is verified as a flow rate measured value or a variation value with respect to the exhaust gas out-in flux of the hot wire sensor 200-1 which is applied to the first cylinder branch pipe of the intake manifold 200. The terminating of the VVL operation learning execution control (S49) is performed when an increase of the response time interval reaches the VVL response time. Therefore, an arrival of the VVL response time means a state in which 1 ms which is the response time interval A reaches from the minimum response time of 5 ms to the maximum response time of 25 ms.

The following Table 1 illustrates the results of performing the VVL operating learning execution control (S40) by setting 1 ms to the response time interval A of within the response time tr in a range of 5 to 25 ms, which is applied to the cycle.

TABLE 1

| Response Time | Function Value | Response Time | Function Value |
|---|---|---|---|
| 8 | 0.00247 | 8 | 0.00091 |
| 8.5 | 0.00407 | 8.5 | 0.00150 |
| 9 | 0.00669 | 9 | 0.00247 |
| 9.5 | 0.01099 | 9.5 | 0.00407 |
| 10 | 0.01799 | 10 | 0.00669 |
| 10.5 | 0.02931 | 10.5 | 0.01099 |
| 11 | 0.04743 | 11 | 0.01799 |
| 11.5 | 0.07586 | 11.5 | 0.02931 |
| 12 | 0.11920 | 12 | 0.04743 |
| 12.5 | 0.18243 | 12.5 | 0.07586 |
| 13 | 0.26894 | 13 | 0.11920 |
| 13.5 | 0.37754 | 13.5 | 0.18243 |
| 14 | 0.50000 | 14 | 0.26894 |
| 14.5 | 0.62246 | 14.5 | 0.37754 |
| 15 | 0.73106 | 15 | 0.50000 |

TABLE 1-continued

| Response Time | Function Value | Response Time | Function Value |
|---|---|---|---|
| 15.5 | 0.81757 | 15.5 | 0.62246 |
| 16 | 0.88080 | 16 | 0.73106 |
| 16.5 | 0.92414 | 16.5 | 0.81757 |
| 17 | 0.95257 | 17 | 0.88080 |
| 17.5 | 0.97069 | 17.5 | 0.92414 |
| 18 | 0.98201 | 18 | 0.95257 |
| 18.5 | 0.98901 | 18.5 | 0.97069 |
| 19 | 0.99331 | 19 | 0.98201 |
| 19.5 | 0.99593 | 19.5 | 0.98901 |
| 20 | 0.99753 | 20 | 0.99331 |
| 20.5 | 0.99850 | 20.5 | 0.99593 |
| 21 | 0.99909 | 21 | 0.99753 |
| 21.5 | 0.99945 | 21.5 | 0.99850 |
| 22 | 0.99966 | 22 | 0.99909 |

Here, the response time represents the response time tr in the range of 5 to 25 ms, which is set in operation S44, the two cells represent 1 ms that is the response time interval A which is set in operation S45, and the function value means a value which is calculated by the sigmoid function.

Figure 2:
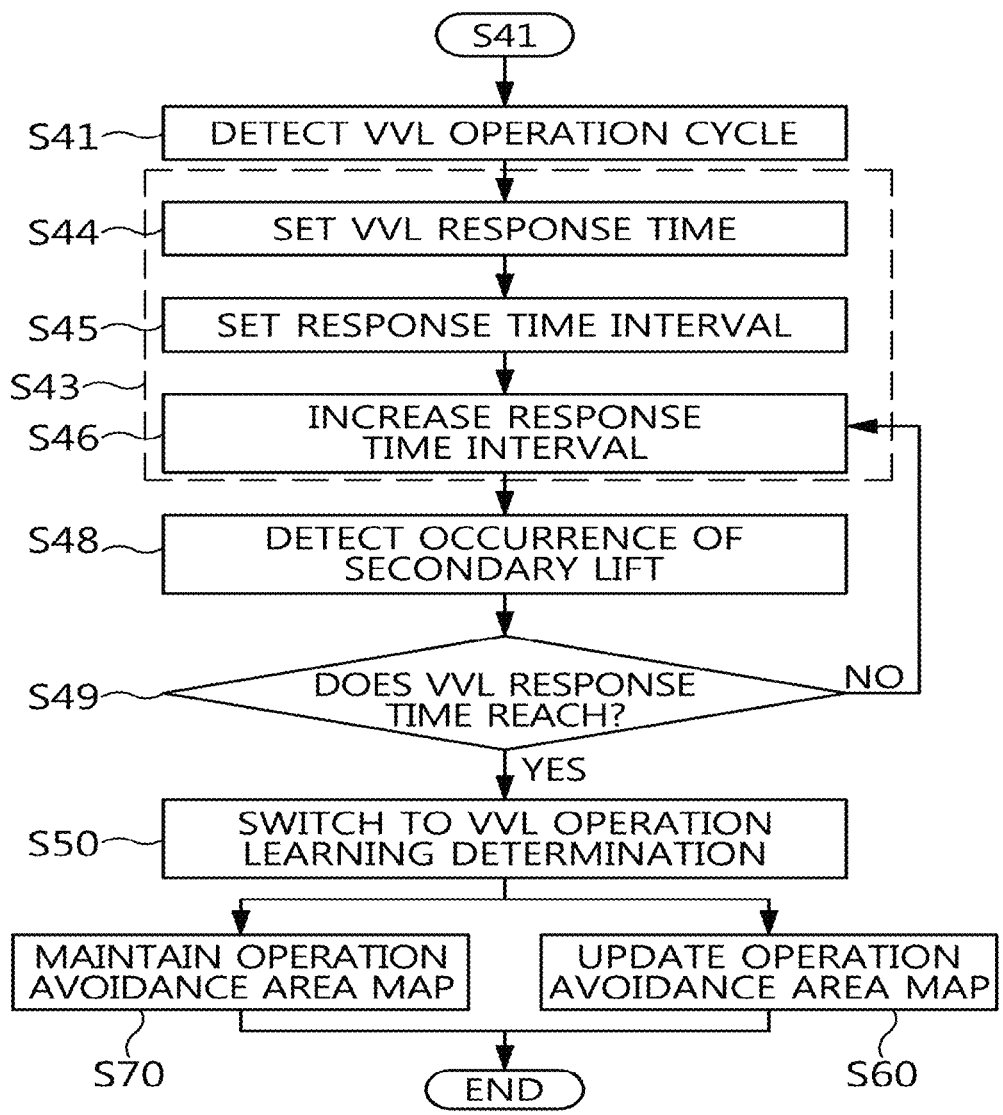

Specifically, the VVL operation learning determination control (S50) is illustrated in FIG. 2.

Figure 3:
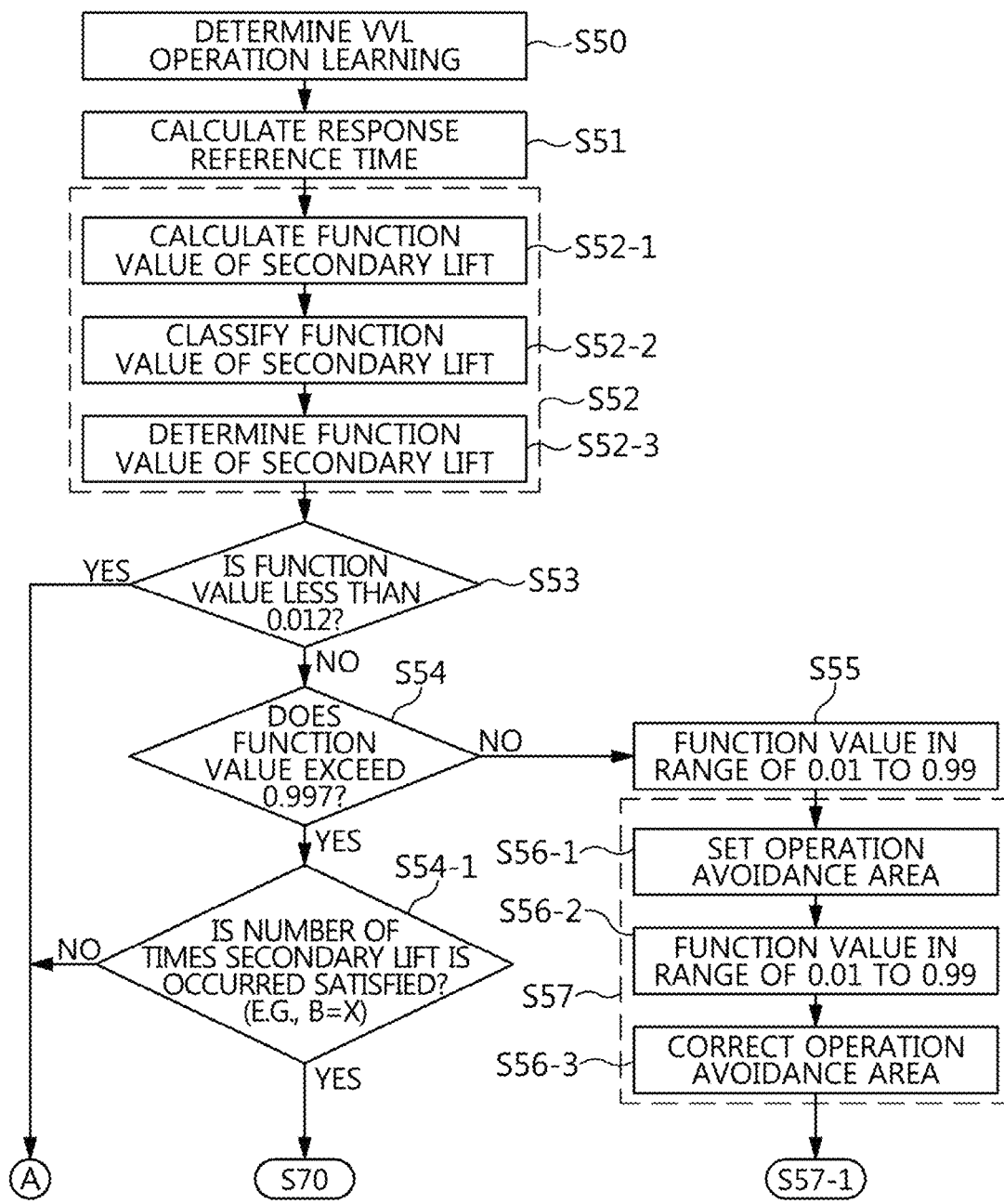
Figure 4:
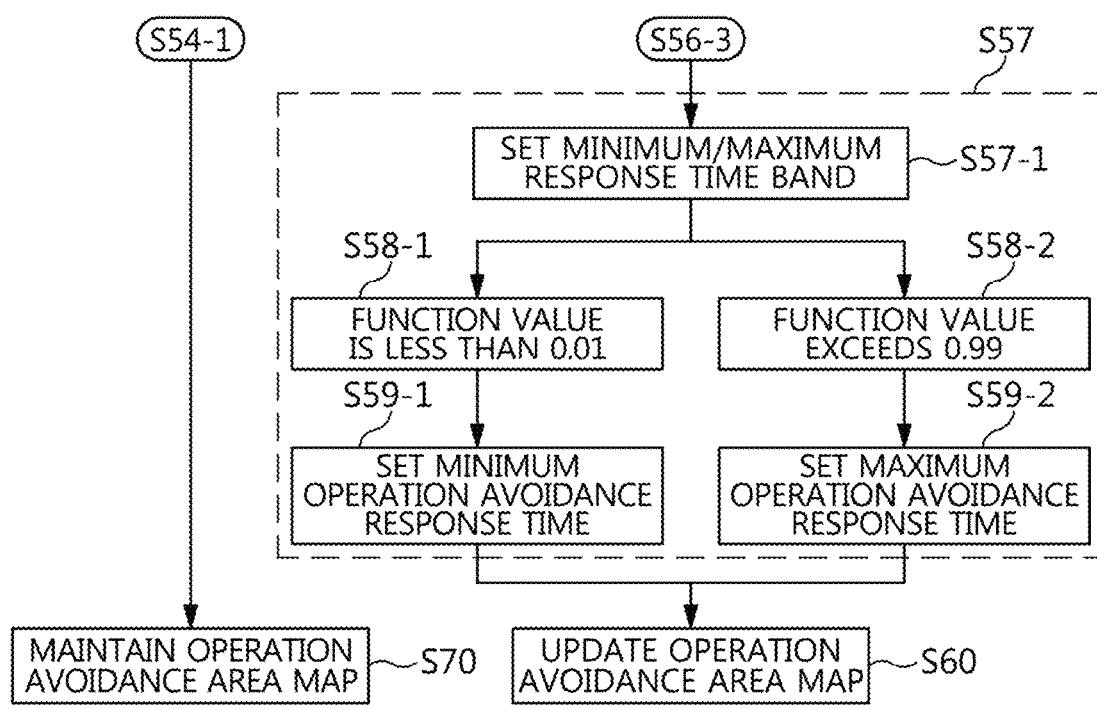

Referring to FIGS. 3 and 4, the VVL learning control S50 is performed through calculating a response reference time (S51), applying a sigmoid function (S52), firstly determining a function value (S53), secondarily determining the function value (S54 and S54-1), thirdly determining the function value (S55), correcting the operation avoidance area (S56), and correcting a response time band (S57).

For example, the calculating of the response reference time (S51) applies the following response reference time equation so as to average the response time of the secondary lift b, which is verified by the detecting of the occurrence of the secondary lift (S48) in the VVL operation learning execution control (S40).

Response reference time equation: ta=(Ta+Tb)/2

Here, "ta" is a response reference time, "Ta" is a minimum response time of occurrence of the secondary lift b, and "Tb" is a maximum response time of non-occurrence of the secondary lift b.

For example, the applying of the sigmoid function (S52) is performed through calculating a function value of the secondary lift (S52-1), classifying the function value of the secondary lift (52-2), and determining the function value of the secondary lift (52-3).

Sigmoid function:

$$\frac{1}{1+e^{(-t_r+t_a)}}$$

Here, "tr" is a VVL response time, and "ta" is a VVL response reference time.

Therefore, the calculating of the function value of the secondary lift (S52-1) applies the sigmoid function of which numerical value of the calculation result is obtained in a numerical range from 0.0xxx to 0.9xxx between digits of 0 and 1 and calculates a function value 0.xxx in Table 1 at every response time interval A by applying the VVL response time tr and the VVL response reference time ta to the sigmoid function. The classifying of the function value of the secondary lift (S52-2) classifies function values into a range of 0.01 to 0.99 in Table 1 between a function value, which is less than 0.01 in Tabl1 regarding as a function value of 0, and a function value, which exceeds 0.99 in Table 1 regarding as a function value of 1. The determining of the function value of the secondary lift (S52-3) determines a response time interval A, which is applied to a non-occurrence area of the secondary lift, as being less than the function value of 0.01, determines a response time interval A, which is applied to an occurrence area of the secondary lift, as exceeding the function value of 0.99, and applies the function values in the range of 0.01 to 0.99 to a response time interval A which is applied as the operation avoidance area.

Figure 8:
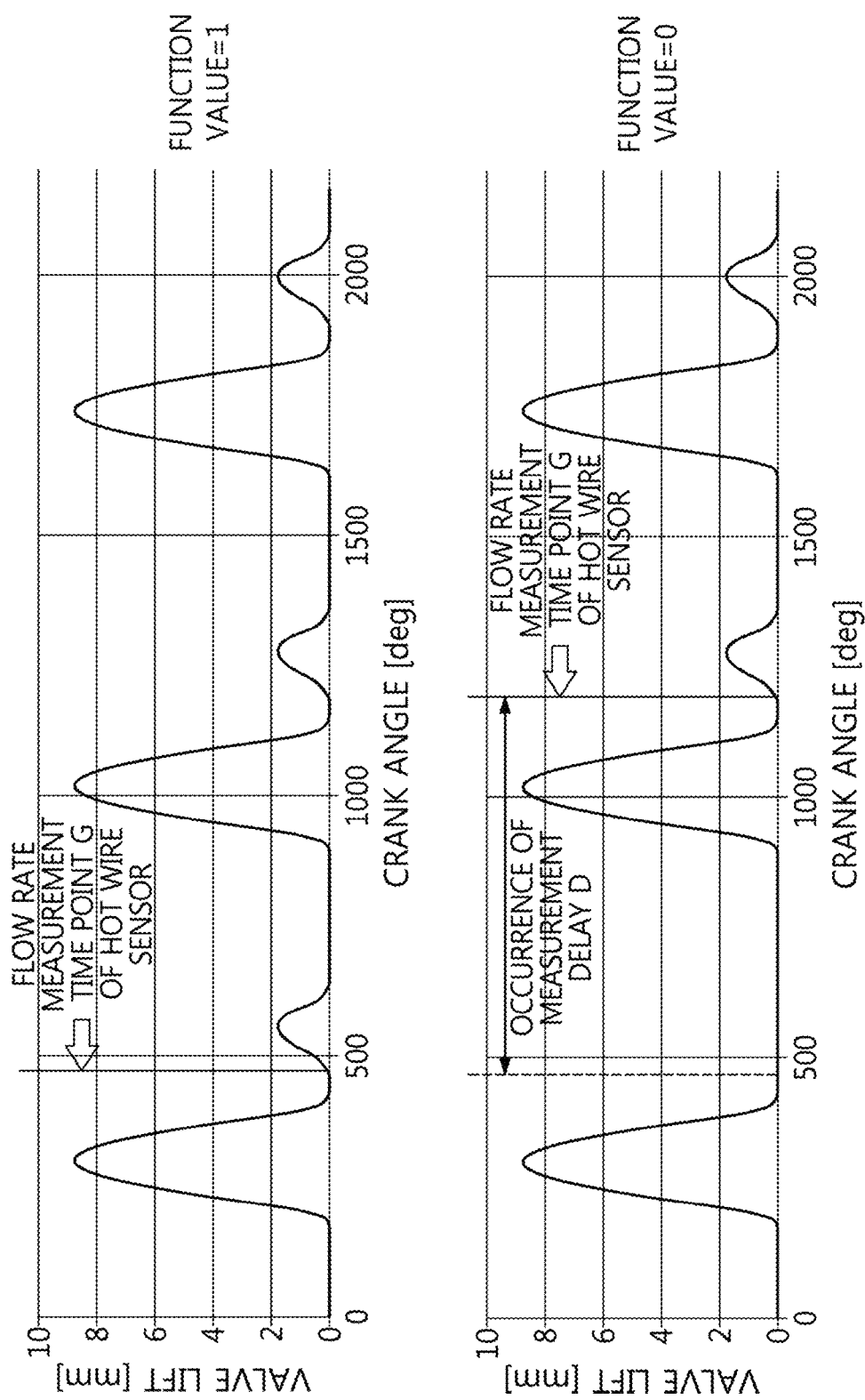
FIG. 8 is a diagram illustrating an example in which a function value is defined using a sigmoid function according to one form of the present disclosure.

FIG. 8 illustrates lift waveforms which are determined as a function value of 1, in which the second lift is occurred, and a function value of 2, in which the second lift is not occurred, by setting an interval between a first main lift (a large waveform) and a second main lift (a large waveform) to a measurement delay occurrence interval D.

As shown in the drawing, when a secondary lift (a small waveform) is occurred subsequent to the first main lift (the large waveform) and is verified through a flow rate measurement time point G of the hot wire sensor 200-1, this is defined as the function value of 1 and regarded as success of the second lift. On the contrary, when a secondary lift (a small waveform) is occurred subsequent to the second main lift (the large waveform) and thus the flow rate measurement time point G of the hot wire sensor 200-1 is not verified at the first main lift (the large waveform), this is defined as the function value of 0 and regarded as a failure of the second lift.

Referring to FIGS. 3 and 4 again, the first determining of the function value (S53) determines whether the function value of the secondary lift is 0 with respect to the VVL response time. When the function value is 0, the first determining of the function value (S53) determines that the secondary lift is not occurred to return to the VVL operation learning execution control (S40) or terminates the process. Otherwise, when the function value is not 0, the first determining of the function value (S53) proceeds to the second determining of the function value (S54 and S54-1).

For example, the second determining of the function value (S54 and S54-1) determines whether the function value of the secondary lift is 1 with respect to the VVL response time. When the function value is 1, the second determining of the function value (S54 and S54-1) determines the secondary lift as being occurred and executes determining whether the number of times the second lift is occurred is satisfied to apply a determination equation of the number of times of occurrence.

Determination equation of the number of times of occurrence: B=X

Here, "B" is the number of times the secondary lift is occurred, "X" is a set value of the number of times the secondary lift is occurred, and about 5 (integer) is applied to "X." Thus, the number of times the secondary lift is occurred B means that the secondary lift is determined as being occurred five or more times for the response time tr, and thus the function value of 1 is calculated five or more times for the response time tr.

As a result, when the secondary lift having the function value of 1 is determined as being occurred less than five times, the process returns to the VVL operation learning execution control (S40) or is terminated. Otherwise, when the secondary lift having the function value of 1 is determined as being occurred five or more times, the process proceeds to maintaining an operation avoidance area map (S70) to intactly keep the operation avoidance area of the operation avoidance area map 10-1. Thus, when the secondary lift is occurred five times, the initially set value of the operation avoidance area map 10-1, which is applied in the VVL operation control (S20), is maintained intactly.

For example, the third determining of the function value (S55) determines whether the function values of the second lift are in the range of 0.01 to 0.99 and applies the correcting of the operation avoidance area (S56) and the correcting of the response time band (S57) to the function values in the range of 0.01 to 0.99.

Specifically, the correcting of the operation avoidance area (S56) is performed through setting the operation avoidance area (S56-1), applying the function values in the range of 0.01 to 0.99 to the operation avoidance area (S56-2), and correcting the operation avoidance area using a response time section in which the function values in the range of 0.01 to 0.99 are generated.

Figure 9:
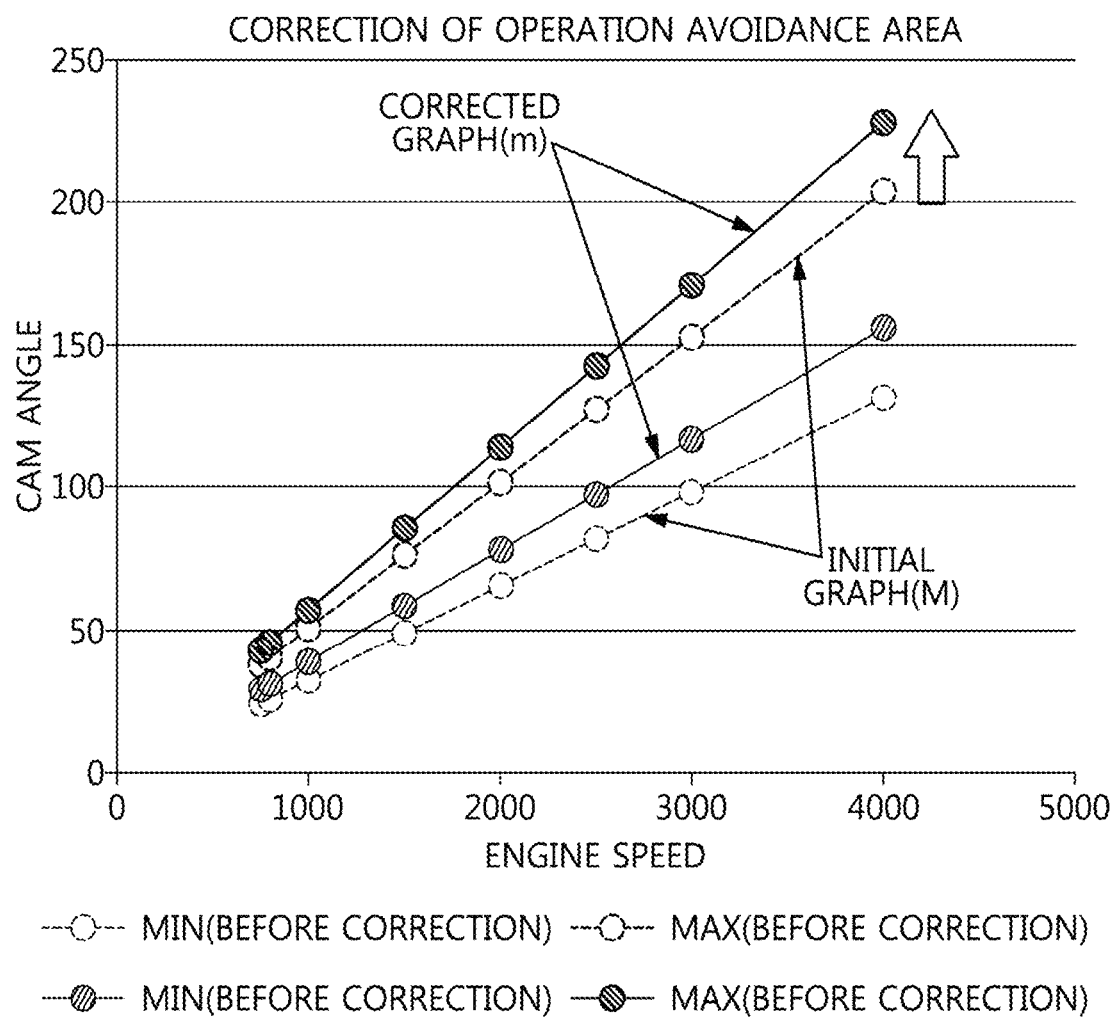
FIG. 9 is a diagram illustrating an example of an upgrade of a VVL operation avoidance area map according to one form of the present disclosure.

Referring to the operation avoidance area map 10-1 of FIG. 9, in the initially set value of the operation avoidance area, it is illustrated that, in order to solve a phenomenon in which the response reference time is delayed as compared with an initial mapping due to physical changes resulting from abrasion and deformation of the electric two-step VVL system 1 or environmental changes resulting from variations in humidity and temperature of outdoor air and a decrease in operating voltage due to battery aging, an operation avoidance area graph of the operation avoidance area map 10-1 is changed from an initial graph M to a corrected graph m.

As a result, the corrected graph m of the operation avoidance area map 10-1 may fundamentally exclude probability of an incomplete engagement of the lock pin 5c as in the initial graph M. Thus, the corrected graph m further delays the minimum/maximum operation avoidance response time curve by as much as a time interval (ms) than the initial graph M such that locking avoidance of the lock pin 5c of the cam follower 5 is further delayed by as much as the time interval (ms).

Specifically, the correcting of the response time band (S57) is performed through setting a minimum/maximum response time band (S57-1), correcting a minimum operation avoidance response time (S58-1 and S59-1), and correcting a maximum operation avoidance response time (S58-2 and S59-2).

For example, the setting of the minimum/maximum response time band (S57-1) distinguishes a minimum function value applied to the correcting of the minimum operation avoidance response time (S58-1 and S59-1) from a maximum function value applied to the correcting of the maximum operation avoidance response time (S58-2 and S59-2) on the basis of the function values in the range of 0.01 to 0.99.

For example, the correcting of the minimum operation avoidance response time (S58-1 and S59-1) is performed through applying a function value that is less than 0.01 (S58-1) and setting the minimum operation avoidance response time (S59-1). On the contrary, the correcting of the maximum operation avoidance response time (S58-2 and S59-2) is performed through applying a function value that exceeds 0.99 (S58-2) and setting the maximum operation avoidance response time (S59-2).

Specifically, in Table 1, the minimum operation avoidance response time may be determined as 12.5 ms which represents a function value that is less than 0.01, and the maximum operation avoidance response time may be determined as 17.5 ms which represents a function value that exceeds 0.99. However, a margin is applied to 1 ms resolution of performance of a measurement device (e.g., the hot wire sensor 200-1) such that the minimum operation avoidance response time is determined as 12 ms and the maximum operation avoidance response time is determined as 18 ms.

Figure 10:
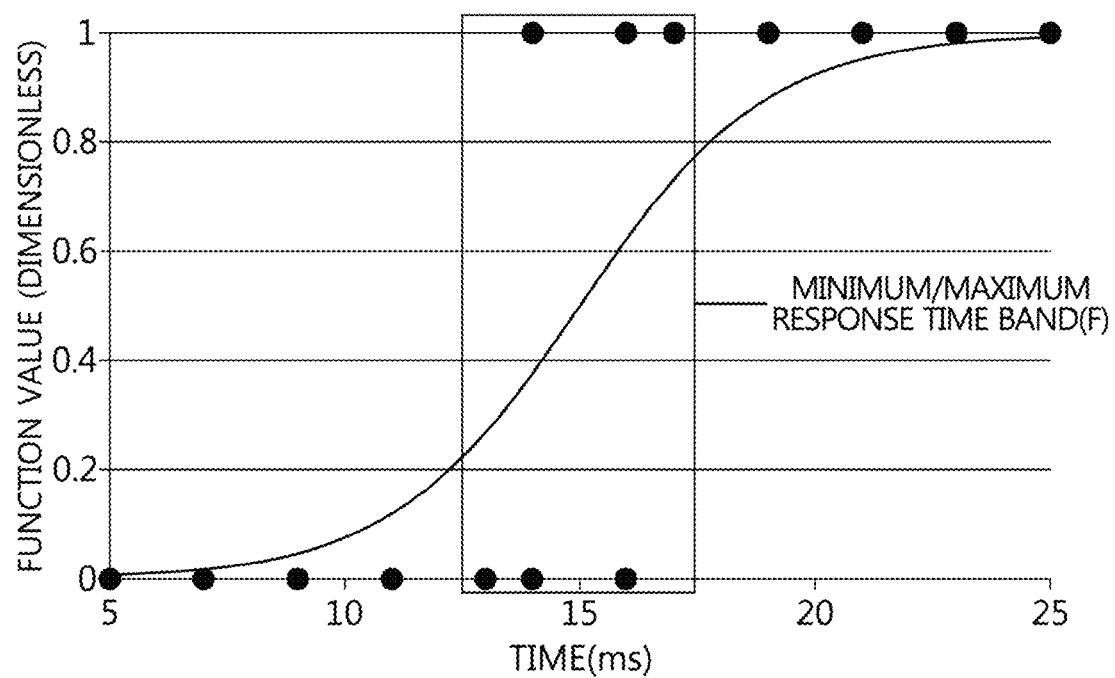
FIG. 10 is a diagram illustrating an example of application of a minimum/maximum response time band according to one form of the present disclosure.

FIG. 10 illustrates a minimum/maximum response time band F having the minimum operation avoidance response time of 12 ms and the maximum operation avoidance response time of 18 ms.

As described above, in the method of a two-step VVL malfunction avoidance learning control for a two-step VVL operation learning control applied to the electric two-step VVL system 1 according to the present embodiment, when the VVL operation implemented of the main lift and the secondary lift is verified by the lift controller 10, the method executes the system application control to perform the VVL operation learning with respect to the success of the secondary lift using a response time of the operation avoidance area preventing a locking failure of the lock pin 5c of the cam follower 5 and correct the response time band, which is included in the response time due to the VVL operation learning, to change the operation avoidance area curve of the operation avoidance area such that response time learning is continuously performed during the vehicle driving through effect continuance of the operation avoidance area. In particular, system aging of the electric two-step VVL system 1 due to the physical and environmental changes is absorbed as a change in operation avoidance area due to the operation learning such that an effect of the operation avoidance area may be maintained.

As described above, an electric two-step variable valve lift (VVL) system according to the present disclosure introduces operation learning, which is capable of performing a two-step VVL malfunction avoidance learning control, into VVL control, thereby implementing the following actions and effects.

First, an initially set value of an operation avoidance area is corrected and updated according to a vehicle state through VVL operation learning such that an initial operation avoidance area map can be appropriately corrected. Second, owing to the correction of the operation avoidance area map, a response reference time, which is the initially set value of the operation avoidance area, is adjusted according to a vehicle. Third, owing to the correction of the operation avoidance area map, even with respect to physical changes due to abrasion and deformation of a VVL system mechanism, changes in humidity and temperature of outdoor air, and environmental changes due to a decrease in operating voltage resulting from battery aging or the like, an effect of the operation avoidance area for fundamentally excluding probability of an incomplete engagement of a lock pin can be intactly maintained. Fourth, the effect of the operation avoidance area is continuously maintained such that a physical damage to the VVL system mechanism, which is caused by a locking failure, is prevented from being generated. Fifth, convenience for the VVL operation learning, which is performed in a state of engine overrun, neutral control, or electric vehicle (EV) driving which is encountered while a vehicle is driving, can be provided. Sixth, the VVL operation learning can be implemented in all kinds of vehicles such as an internal combustion engine vehicle of engine overrun, an advanced driver assistance system (ADAS) mounted vehicle of neutral control, and an electric hybrid vehicle of EV driving.

While the present disclosure has been described with respect to the specific embodiments, it will be apparent to those skilled in the art that various changes and modifications may be made without departing from the spirit and scope of the present disclosure. Accordingly, it should be noted that such alternations or modifications fall within the claims of the present disclosure, and the scope of the present disclosure should be construed on the basis of the appended claims.

What is claimed is:

1. A method of two-step variable valve lift (VVL) malfunction avoidance learning control, the method comprising:
providing a two-step VVL system operated with a main lift and a secondary lift;
verifying, by an electronic control unit (ECU), an operation avoidance area based on locking of a lock pin of a cam follower;
performing VVL operation learning, in which a failure of occurrence of the second lift is determined based on a locking failure of the cam follower due to an initially set value of the operation avoidance area; and
reflecting the operation avoidance area to the two-step VVL system with a corrected set value which is obtained through the VVL operation learning,
wherein: the reflecting operation avoidance area to the two-step VVL system is implemented by a system application control, and
the system application control includes:
a VVL operation learning execution control of determining a vehicle condition in which the VVL operation learning is performable, and detecting the occurrence of the secondary lift by setting a response time as an elapsed time from a VVL operation signal until the secondary lift is occurred; and
VVL operation learning determination control of calculating function values in a range of 0 to 1 based on a response reference time with respect to the response time and the occurrence of the secondary lift, and correcting the operation avoidance area by changing the initially set value into the corrected set value due to the function value, and
wherein the VVL operation learning determination control includes:
calculating the response time based on a minimum response time in which the secondary lift is occurred and a maximum response time in which the secondary lift is not occurred;
applying a function to the response time and the response reference time to calculate function values in a range of 0 to 1;
determining a function value area for correcting an operation avoidance area by classifying the calculated function values; and
correcting the operation avoidance area by setting the function value area to the corrected set value.

2. The method of claim 1, wherein the initially set value and the corrected set value are response times, and each of the response times is an elapsed time from a VVL operation signal to the occurrence of the secondary lift.

3. The method of claim 1, wherein the operation avoidance area is represented by an operation avoidance area curve in which a cam angle is matched to an engine speed.

4. The method of claim 1, wherein the vehicle condition includes at least one of an engine overrun, a neutral control, an electric vehicle (EV) driving.

5. The method of claim 1, wherein the VVL operation learning execution control includes:
detecting a VVL operation cycle, in which a time interval between an end time point of the main lift and an occurrence time point of the secondary lift is set to the VVL operation cycle;
verifying a VVL response time, in which the response time in the VVL operation cycle is increased by as much as a response time interval; and
detecting a number of times of the occurrences of the secondary lift for the response time.

6. The method of claim 5, wherein the verifying the VVL response time includes:
setting the response time to a minimum response time or a maximum response time;
setting the response time interval to the response time; and
increasing the response time interval from the minimum response time to the maximum response time.

7. The method of claim 6, wherein the response time interval is 1 ms.

8. The method of claim 5, wherein the number of times of occurrences of the secondary lift is counted by measuring a flow rate with respect to exhaust gas out-in flux through a hot wire sensor.

9. The method of claim 1, wherein the response reference time is calculated as an average value of the minimum response time and the maximum response time.

10. The method of claim 1, wherein the classifying the functional values is performed to obtain a function value of 0.012 with respect to a failure of the secondary lift, a function value of 0.997 with respect to success of the secondary lift, and a function value in a range of 0.01 to 0.99 with respect to a change in initially set value.

11. The method of claim 10, wherein the function value of 0.997 is a condition of verifying that the number of times the secondary lift is occurred is five or more times for the response time.

12. The method of claim 1, wherein: the corrected set value sets a response time band; and
the response time band is classified into a minimum operation avoidance response time and a maximum operation avoidance response time.

13. The method of claim 12, wherein each of the minimum operation avoidance response time and the maximum operation avoidance response time has a margin with respect to 1 ms resolution.

14. An electric two-step variable valve lift (VVL) system operating with a main lift and a secondary lift, the electric two-step VVL system comprising:
a lift controller, when the two-step VVL system operates, configured to:
execute a system application control,
perform VVL operation learning with respect to success of a secondary lift for a response time of an operation avoidance area preventing a locking failure of a lock pin of a cam follower, and
correct the operation avoidance area by correcting a response time band with respect to the response time through the VVL operation learning; and
a VVL operation avoidance area map in which an operation avoidance area curve with respect to the response time band is corrected such that the operation avoidance area is corrected,
wherein: the lift controller is configured to detect a flow rate measurement value of a hot wire sensor; and
the flow rate measurement value is an exhaust gas out-in flux supplied to a cylinder of an engine.

15. The electric two-step VVL system of claim 14, wherein the hot wire sensor is provided at at least one cylinder branch pipe among cylinder branch pipes of an intake manifold.

* * * * *